Dec. 28, 1965 W. MIEDERER ETAL 3,226,270
METHOD OF CRUCIBLE-FREE PRODUCTION OF GALLIUM ARSENIDE RODS FROM ALKYL GALLIUMS AND ARSENIC COMPOUNDS AT LOW TEMPERATURES
Filed Sept. 24, 1963
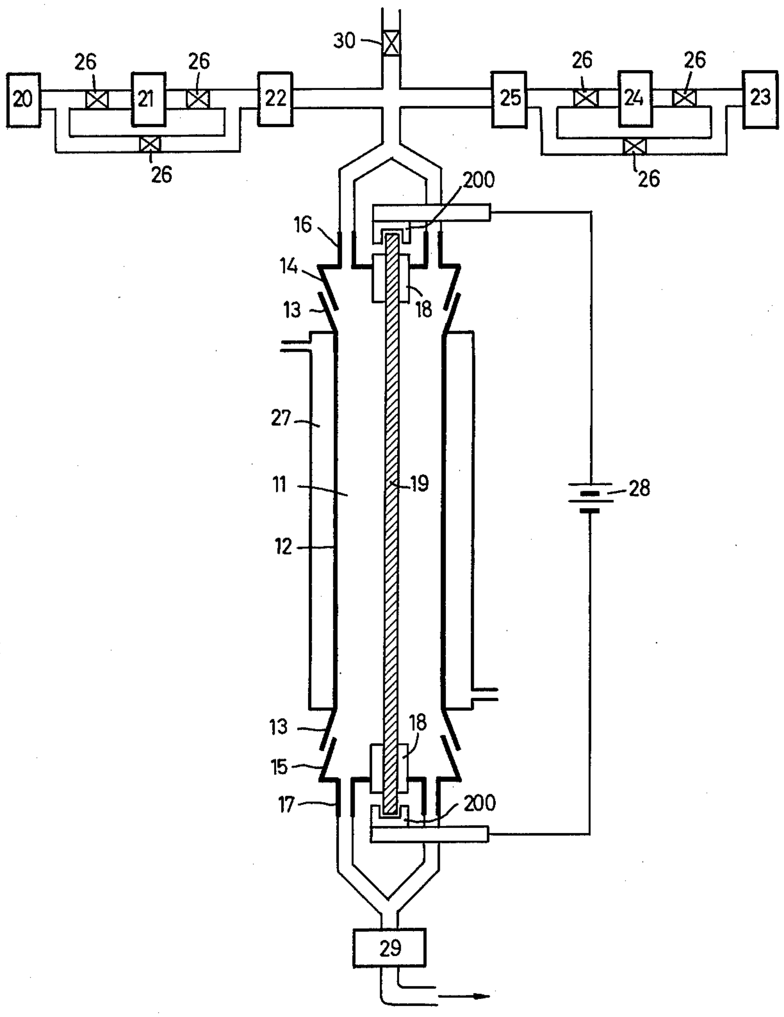

United States Patent Office 3,226,270
Patented Dec. 28, 1965

3,226,270

METHOD OF CRUCIBLE-FREE PRODUCTION OF GALLIUM ARSENIDE RODS FROM ALKYL GALLIUMS AND ARSENIC COMPOUNDS AT LOW TEMPERATURES

Walter Miederer, Nurnberg, Günther Ziegler, Erlangen, and Richard Dötzer, Nurnberg, Germany, assignors to Siemens-Schuckertwerke Aktiengesellschaft, Berlin-Siemensstadt, Germany, a corporation of Germany Filed Sept. 24, 1963, Ser. No. 311,161
Claims priority, application Germany, Sept. 25, 1962, S 81,640
2 Claims. (Cl. 148—174)

Our invention relates to a production of gallium arsenide for electronic purposes by thermal or pyrolytic dissociation of gaseous gallium- and arsenic-compounds and precipitating the evolving gallium arsenide upon a carrier or core rod of the same material.

The production of gallium arsenide in crucibles or quartz boats within evacuated quartz ampules at 1400° C. from the two constituent elements is known. The gallium arsenide produced by this method is always contaminated however, particularly by silicon and oxygen, because gallium reduces quartz at 1400° C. The amount of impurities thus contained in the gallium arsenide cannot be appreciably reduced by zone melting and similar refining techniques. This is one of the reasons why gallium arsenide has not yet achieved a technological importance as electronic semiconductor material comparable to that or germanium and silicon.

From the viewpoint of desired purity, it would be advisable to produce gallium arsenide without crucible at lower temperatures from the one mentioned. We attempted to employ the pyrolytic process, generally employed for the production of silicon for example according to U.S. Patent 3,099,534 for producing GaAs by pyrolytic dissociation of gallium halogenides. However, in such a pyrolytic dissociation and precipitation of GaAs from Ga-halogenides and arsenic or arsenic-compounds, the GaAs precipitates at the colder rather than at the hotter localities within the reaction vessel as a result of particular equilibrium conditions involved in the reaction. Furthermore, the necessary pyrolytic temperatures were from above 600 to 1000° C. to obtain appreciable quantities of GaAs.

Copending application of R. Dötzer, Ser. No. 141,488, filed September 28, 1961, and assigned to the assignee of the present invention, discloses a method of producing $A^{III}B^{V}$ compounds with the aid of alkyl metals. This method, when applied to gallium arsenide, usually results in a fine granular product which requires further processing before being suitable for use in electronic semiconductor devices.

It is an object of our invention to provide a method of economically producing gallium arsenide rods of crystalline constitution and high purity by pyrolytic or thermal dissociation of gaseous substance and thereby growing a precipitating gallium arsenide upon a core rod up to a desired diameter, with the result that the the finished rod can be sliced into wafers or otherwise subdivided substantially in the manner applied in the production of semiconductor components of germanium or silicon.

According to our invention, gallium arsenide rods are produced by a crucible-free process from alkyl galliums and arsenic compounds in the following manner. A core rod of gallium arsenide is mounted in an enclosed reaction vessel of quartz or quartz glass and is heated to a temperature between 100 and 600 C. The gaseous mixture of hydrogen, alkyl galliums and arsenic compounds is introduced into the reaction vessel and thus caused to impinge upon the heated gallium arsenide core at a flowing speed of 0.5 to 50 liters per hour. As a result, the alkyl gallium and arsenide compounds become thermally dissociated and precipitate as crystalline gallium arsenide upon the gallium-arsenide core. During the process, the quartz vessel is maintained at a temperature below 300° C., so that the reaction gas and its dissociation products do not chemically attack the quartz thus preventing foreign substances from the vessel walls to become built into the GaAs being precipitated. Particularly well suitable for this process are, for example, arsenic-halides, alkyl-arsenic, arsenic-alkyl-halogenides, arsenic-alkyl-hydrides or arsenic hydrides. The gallium arsenide core is preferably heated and maintained at a temperature of 400° C., and this is preferably done by passing electric current lengthwise through the gallium-arsenide rod.

The method of the invention will be further described with reference to the accompanying drawing showing, schematically and by way of example an apparatus for practicing the invention.

The illustrated reactor vessel 11 comprises a quartz tube 12 having for example 120 mm. length and 300 mm. diameter, a conical ground and a ground neck portion 13 at each end. The reactor vessel is closed by a top cover 14 and a bottom portion 15. Gas inlet nipples 16 are mounted in the cover portion 14. Gas outlet nipples 17 are provided in bottom portion 15. The center of the top portion and the center of the bottom portion is provided with an insulating sleeve 18 for mounting and holding the core rod 19 of gallium arsenide. This insulating sleeve hermetically seals the rod at the locality where it passes through the outside of the vessel. The core rod is joined with electric contact 200 at both ends outside of the reactor structure. The contactors are connected with a current source 28 by means of which a heating current is directly passed lengthwise through the rod for the purpose of heating it up to the desired temperature. A controlled resistor of adjustable resistance (not shown) is preferably connected in the electric circuit for adjusting and maintaining the proper temperature of the rod.

A current of hydrogen is supplied from the storage container 20 through an alkyl-gallium container 21. The hydrogen current, laden with the gaseous alkyl gallium then passes through a flow meter 22. Another hydrogen storage container 23 serves for supplying a current of hydrogen through a container 24 partly filled with arsenic trichloride $AsCl_3$. The amount of the $AsCl_3$ which evaporates together with the hydrogen passes through a flow meter 25. The two gas currents are mixed and passed through the inlet nipples 16 into the reactor vessel.

The alkyl and arsenic compounds become dissociated at the heated gallium arsenide core, and gallium arsenide is precipitated upon the core. The residual gas passes through an absorption vessel 29 for recovering gallium and arsenic compounds. From the absorber 29 the waste gasses are withdrawn by suitable exhaust means. Valve 30 may serve as a safety or exhaust valve. By pass valves 26 permit rinsing the reactor and all gas lines with hydrogen alone. Such rinsing operation is performed, before alkyl galliums and arsenic compounds are permitted to pass together with the hydrogen into the reactor after the air previously contained in the reaction space has been removed by the hydrogen rinse and the gallium arsenide core has been brought up to the processing temperature. The reactor is surrounded by a heat exchanger jacket 27 which permits maintaining the reactor wall at a temperature below the dissociation temperature of the alkyl galliums and the arsenic compounds but above the condensation temperatures of these compounds. The cooling jacket 27 is provided with inlet and outlet nipples for liquid coolant by means of which the wall temperature is preferably adjusted from 50 to 90° C.

By passing alkyls of zinc, cadmium, selenium or tellurium by means of hydrogen into the reactor during the above-described process, the gallium arsenide layer growing upon the core rod can rapidly be doped and a desired content of doping-metal atoms can thus be adjusted.

By ultimately supplying different dopants consisting of alkyl metals, using each time hydrogen as a carrier or driving medium in the above-described manner, differently doped layers can be alternately precipitated upon the core rod. In this manner the growing layer of gallium arsenide can be given for example a p-type, n-type layer sequence.

*Example*

A gallium arsenide core of 150 mm. length and 3 mm. diameter is heated to 400° C. After rinsing with hydrogen from source 20 (valves 26 being closed and valve 26' being open), the alkyl-gallium evaporator 21 is placed into operation by closing the valve 26' and opening the two upper valves. The evaporator 21 is filled with triethyl gallium, $Ga(C_2H_5)_3$. With the evaporator 21 kept at 25° C., the hydrogen current passing through the evaporator is maintained at a flow rate of 3 liters per hour. At the same time, the evaporator 24 is analogously placed into operation. This evaporator is filled with $AsCl_3$. Hydrogen passes through the evaporator 24 at 25° C. at a rate of 3.5 liters per hour. Within a period of 30 minutes, a GaAs layer of about 25 micron thickness is thus grown upon the gallium arsenide core.

The flow rate of the two hydrogen streams through evaporator 21 and evaporator 24 is such that the evaporating quantity of materials from both evaporators is in about equimolar proportions. When desired, additional hydrogen may be introduced into the reaction vessel through valve 30 to result in a desired hydrogen-to-active-substances ratio. In the specific example given above, the ratio of hydrogen to the triethylgallium is about 1:4.2 and to arsenide trichloride about 1:5.5, both by weight.

Another specific suitable alkyl gallium compound is $Ga(CH_3)_3$. Examples of suitable arsenic compounds are alkyl arsenic—trimethyl arsine; arsenic-alkyl-halogenides—$AsRCl_2$, $AsR_2Cl$; arsenic-alkyl-hydrides—$AsRH_2$, $AsR_2H$; arsenic-hydrides—arsine. In all cases, R= —$CH_3$ or —$C_2H_5$.

We claim:

1. The method of crucible-free production of gallium arsenide rods, which comprises heating a gallium-arsenide core rod in an enclosed reaction vessel of quartz material by passing electric current lengthwise through the rod, maintaining the rod at a temperature between 100 and 600° C.; blowing into the vessel and into contact with the heated rod a gas mixture of hydrogen, triethyl gallium and arsenic trichloride at a flow rate of 0.5 to 50 liters per hour, whereby the triethyl gallium and arsenic trichloride are thermally dissociated and gallium arsenide is precipitated upon the core rod and doping the precipitating layer of GaAs by introducing a doping agent selected from the group consisting of alkyl-zinc, alkyl-cadmium, alkyl-selenium and alkyl-tellurium into the reaction vessel concomitantly with the reaction compounds.

2. The method of crucible-free production of gallium-arsenide rods, which comprises heating a gallium-arsenide core rod in an enclosed reaction vessel of quartz material by passing electric current lengthwise through the rod, maintaining the rod at a temperature between 100 and 600° C.; blowing into the vessel and into contact with the heated rod a gas mixture of hydrogen, triethyl gallium and arsenic trichloride at a flow rate of 0.5 to 50 liters per hour, whereby the triethyl gallium and arsenic trichloride are thermally dissociated and gallium arsenide is precipitated upon the core rod, doping the precipitation layer of GaAs by introducing a doping agent selected from the group consisting of alkyl-zinc, alkyl-cadmium, alkyl-selenium and alkyl-tellurium into the reaction vessel concomitantly with the reaction compounds, and varying the doping of the precipitating layer of GaAs by stopping the introduction of the above doping agent and introducing a second doping agent of another type selected from the group consisting of alkyl-zinc, alkyl-cadmium, alkyl-selenium and alkyl-tellurium into the reaction vessel concomitantly with the reaction compounds.

References Cited by the Examiner

UNITED STATES PATENTS

| | | | |
|---|---|---|---|
| 3,030,189 | 4/1962 | Schweickert et al. ---- | 148—1.6 |
| 3,057,690 | 10/1962 | Reuschel et al. ------ | 148—1.6 |

OTHER REFERENCES

Coates: Organo-Metallic Compounds, John Wiley and Sons, Inc., New York, October 26, 1956, pages 84–92.

Harrison et al.: article, IBM Technical Disclosure Bulletin, vol. 4, No. 1, June 1961, page 32.

BENJAMIN HENKIN, *Primary Examiner.*

DAVID L. RECK, *Examiner.*